United States Patent
Lee et al.

(10) Patent No.: US 8,526,719 B2
(45) Date of Patent: Sep. 3, 2013

(54) METHOD OF CONVERTING COLOR IMAGE INTO GRAYSCALE IMAGE AND RECORDING MEDIUM STORING PROGRAM FOR PERFORMING THE SAME

(75) Inventors: Seung-Yong Lee, Pohang-si (KR); Yong-Jin Kim, Pohang-si (KR); Cheol-Hun Jang, Pohang-si (KR)

(73) Assignee: Postech Academy-Industry Foundation, Gyeongbuk (KR)

( * ) Notice: Subject to any disclaimer, the term of this patent is extended or adjusted under 35 U.S.C. 154(b) by 334 days.

(21) Appl. No.: 13/001,780

(22) PCT Filed: Dec. 29, 2009

(86) PCT No.: PCT/KR2009/007876
§ 371 (c)(1),
(2), (4) Date: Dec. 28, 2010

(87) PCT Pub. No.: WO2011/081226
PCT Pub. Date: Jul. 7, 2011

(65) Prior Publication Data
US 2011/0176726 A1  Jul. 21, 2011

(51) Int. Cl.
*G06K 9/00* (2006.01)

(52) U.S. Cl.
USPC ....................................... 382/163

(58) Field of Classification Search
None
See application file for complete search history.

(56) References Cited

U.S. PATENT DOCUMENTS 7,142,239 B2 * 11/2006 Cho ............................ 348/273
2011/0052029 A1 * 3/2011 Connah et al. ................ 382/131

FOREIGN PATENT DOCUMENTS

| JP | 11-339034 A | 12/1999 |
| KR | 10-2008-0058893 A | 6/2008 |
| WO | 2006-004202 A1 | 1/2006 |

OTHER PUBLICATIONS

A.A. Gooch, S.C. Olsen, J. Tumblin, B. Gooch, Color2Gray: salience preserving color removal, ACM Trans Graphics 24 (2005) 634-639 (Proceedings of SIGGRAPH).*
International Search Report from PCT/KR2009/007876 dated Aug. 31, 2010 (5 pages).
Written Opinion from PCT/KR2009/007876 dated Aug. 31, 2010 (3 pages).
Patent Abstracts of Japan; Publication No. 11-339034 dated Dec. 10, 1999 (1 page).
Korean Intellectual Property Office Abstract; Publication No. 1020080058893A dated Jun. 26, 2008 (1 page).
Kim, Y. et al.; "Robust Color-to-gray via Nonlinear Global Mapping," ACM Transactions on Graphics (ACM SIGGRAPH Asia 2009), vol. 28, No. 5, Dec. 2009 (4 pages).

* cited by examiner

*Primary Examiner* — Barry Drennan
*Assistant Examiner* — Feng Niu
(74) *Attorney, Agent, or Firm* — Osha Liang LLP

(57) ABSTRACT

Provided are a color to grayscale image conversion method of converting a color image into a grayscale image while maintaining original features of the color image, and a recording medium storing a program for performing the same. When an original color image is input, a target gradient with the features of the input original color image is acquired, and a global mapping function for converting the original color image into a grayscale image is determined based on the acquired target gradient. Thereafter, the original color image is converted into a grayscale image using the determined global mapping function. Therefore, it is possible to quickly convert a color image into a grayscale image, and to acquire a high-quality grayscale image with features of color difference included in the original color image.

8 Claims, 5 Drawing Sheets

FIG. 5
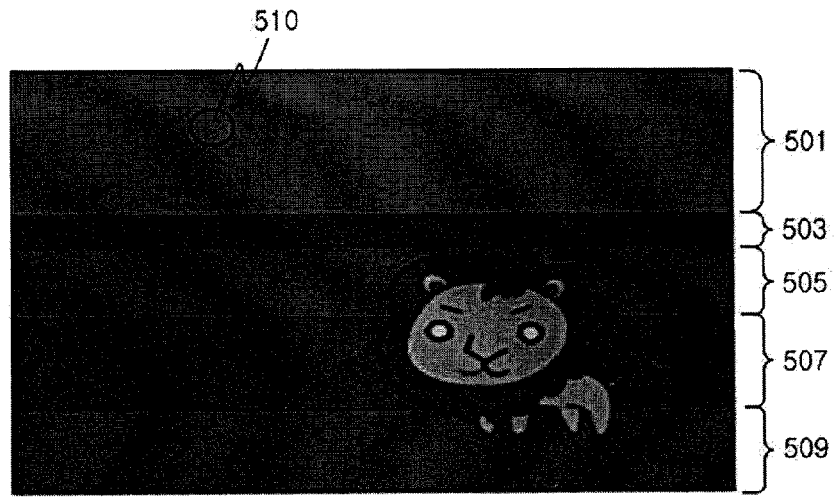
(a)
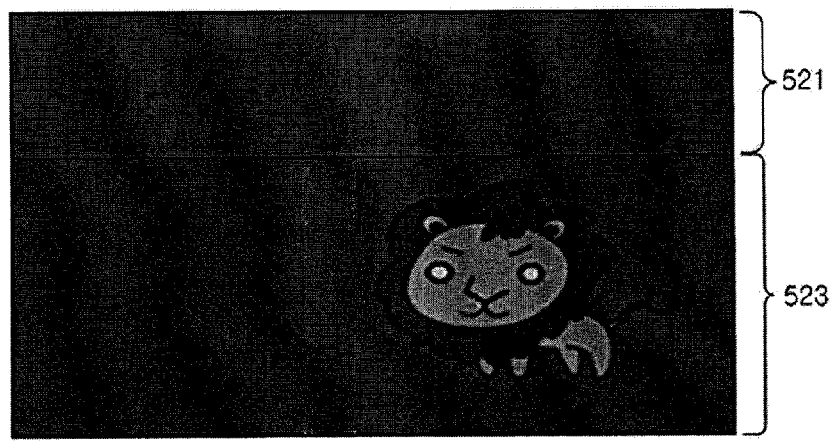
(b)
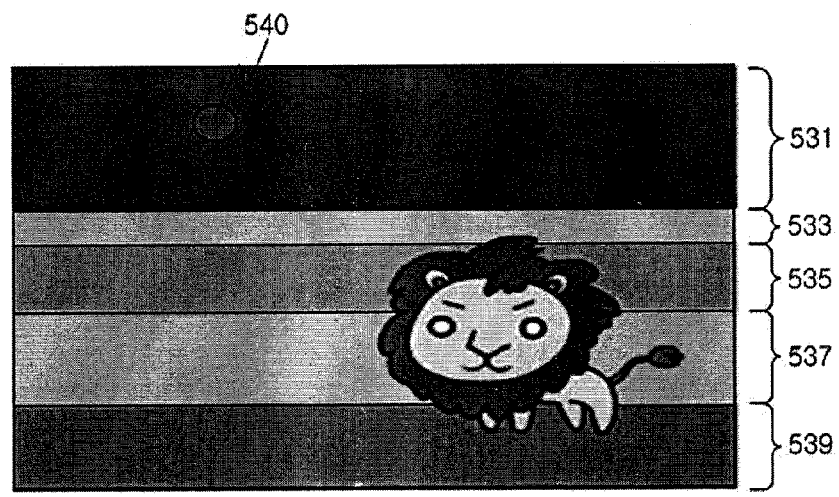
(c)

METHOD OF CONVERTING COLOR IMAGE INTO GRAYSCALE IMAGE AND RECORDING MEDIUM STORING PROGRAM FOR PERFORMING THE SAME

TECHNICAL FIELD

The present invention relates to a color conversion of an image, and more particularly, to a method of quickly converting a color image into a grayscale image while maintaining original visual features of the color image, and a recording medium storing a program for performing the same.

BACKGROUND ART

Technology for converting a color image into a grayscale image is mainly used in printing color images with a black and white printing apparatus. In addition, the above-mentioned color to grayscale image conversion technology may be used to generate an intermediate image required for the application of various image processing techniques, such as edge detection, and image enhancement, and various computer vision techniques, such as object tracking.

In general, luminance Y of a color has been mainly used in a process of converting a color image into a grayscale image. As for the color's luminance, National Television System Committee (NTSC) Y or Commission Internationale de L'Eclairage (CIE) Y defined in the CIE XYZ color space may be exemplified.

In a method of converting a color image into a grayscale image using luminance, it is possible to accurately represent independent brightness of each pixel. However, there is a problem in that visual features for the color image may be lost since color contrast between adjacent pixels on an image cannot be preserved. For example, when areas adjacent to one another in an original color image have different colors and the same luminance, clear distinction between these areas is found on the original color image, but no clear distinction between them is found on a converted grayscale image. Due to this, the grayscale image converted using luminance may have a different visual appearance than the original color image.

In order to solve this problem, color to grayscale image conversion methods for preserving color contrast of an original color image have been proposed, which may be largely divided into a global mapping method and a local mapping method.

According to the global mapping method, the same color is mapped into the same grayscale value to thereby generate a grayscale image. On the other hand, according to the local mapping method, even the same color is mapped into different grayscale values depending on positions in which pixels are placed on an image to thereby generate a grayscale image.

The above-mentioned conventional color to grayscale image conversion methods help preserve color contrast of an original color image in the converted grayscale image, but are limited in many practical applications.

For example, papers entitled, "Re-coloring Images for Gamuts of Lower Dimension," by Rasche, et al., and "Color2Gray: Saliency Preserving Color Removal," by Gooch, et al., disclose global mapping methods which have problems of taking more than several minutes to perform conversion for one image, that is, a slow processing speed. Additionally, many generated grayscale images have a different appearance than their original color images since no consideration is given for luminance of a color.

Also, a paper entitled, "Decolorize: fast, contrast enhancing, color to grayscale conversion," by Grundland and Dodgson, discloses a global mapping method which has an advantage of a fast processing speed, but has a disadvantage in that excessively simple modeling of a global mapping function into a linear function leads to ineffective preservation of color contrast.

Also, papers entitled, "Spatial Color-to-Grayscale Transform Preserving Chrominance Edge Information," by Bala and Eschbach, and "Apparent Grayscale: A Simple and Fast Conversion to Perceptually Accurate Images and Video," by Smith, et al., disclose a color to grayscale image conversion method, classified as a local mapping method, in which areas with the same color may be mapped into different grayscale values, resulting in noticeable distortion of flat regions in the original color image.

As described above, the previous color to grayscale image conversion methods can help preserve color contrast of an original color image, but either involve high computational overhead or generate grayscale images having dissimilar visual appearance to the original color images.

DISCLOSURE

Technical Problem

The present invention is directed to providing a color to grayscale image conversion method in which an original color image can be quickly converted into a grayscale image while maximizing the preservation of visual appearance of the color image.

Also, the present invention is directed to providing a recording medium storing a program which performs the method of converting a color image into a grayscale image.

Technical Solution

One aspect of the present invention provides a method of converting a color image into a grayscale image, the method including: inputting an original color image; acquiring a target gradient including features of the input original color image; determining a global mapping function for converting the original color image into a grayscale image based on the acquired target gradient; and converting the original color image into a grayscale image using the determined global mapping function.

Acquiring the target gradient including the features of the input original color image may include converting a color space of the input original color image into a Commission Internationale de L'Eclairage (CIE) L*a*b* color space.

Acquiring the target gradient including the features of the input original color image may include: acquiring an x gradient by determining a sign and a value of a difference between two pixels adjacent to each pixel of the color image converted into the CIE L*a*b* color space in an x axial direction; and acquiring a y gradient by determining a sign and a value of a difference between two pixels adjacent to each pixel of the color image converted into the CIE L*a*b* color space in a y axial direction.

Determining the global mapping function for converting the original color image into the grayscale image based on the acquired target gradient may include determining a global mapping function minimizing a difference between a gradient of the converted grayscale image and the corresponding acquired gradient of the original color image.

Determining the global mapping function for converting the original color image into the grayscale image based on the acquired target gradient may include: modeling the global mapping function as g=L+f(H)C, where, L, C, and H denote luminance, chroma, hue components of a color in a CIE LCH color space, respectively, and f(H) denotes a trigonometric polynomial of H.

Determining the global mapping function for converting the original color image into the grayscale image based on the acquired target gradient may further include: modeling a cost function for determining coefficients in the trigonometric polynomial f(H) included in the global mapping function; acquiring a value which minimizes the cost function; and determining the global mapping function by applying the value to the global mapping function.

Converting the original color image into the grayscale image using the determined global mapping function may include generating the grayscale image by applying the determined global mapping function to each pixel of the original color image.

Converting the original color image into the grayscale image using the determined global mapping function may include: generating an intermediate grayscale image by applying the determined global mapping function to each pixel of the original color image; and converting the intermediate grayscale image into the grayscale image by applying a scheme of converting L of a CIE LAB color space into Y of a CIE XYZ color space to the intermediate grayscale image.

Another aspect of the present invention provides a recording medium storing a program for performing a method of converting a color image into a grayscale image, the program including: acquiring a target gradient including features of the input original color image; determining a global mapping function for converting the original color image into the grayscale image based on the acquired target gradient; and converting the original color image into a grayscale image using the determined global mapping function.

Advantageous Effects

According to a method of converting a color image into a grayscale image and a recording medium storing a program which performs the same, an original color image is converted into an image in a CIE L*a*b* color space, and then gradients in x and y axial directions are acquired from the converted image in the color space. Thereafter, the original color image is converted into an image in a CIE LCH color space, a global mapping function (g) is modeled, and then an optimal nonlinear function f(H) included in the modeled global mapping function (g) is determined. Using the optimal nonlinear function f(H), a global mapping function (g) is determined. An intermediate grayscale image is generated by applying the determined global mapping function (g) to each pixel of the color image, and then an equation for transformation from L of CIE LAB into Y of CIE XYZ is applied to each pixel of the intermediate grayscale image, so that a final grayscale image displayable on an image display device is generated.

Therefore, it is possible to rapidly and simply convert a color image into a grayscale image, and thus to reduce a processing load on a processor.

Also, since the original color image is converted into a grayscale image so that the gradient of the original color image can be preserved as much as possible, it is possible to preserve a color contrast of the original color image, and thus to generate a grayscale image with original visual features based on the color contrast of the color image.

Also, each pixel of a grayscale image converted by a process of minimizing a coefficient of f(H) modeled as a trigonometric polynomial has a value which is maximally similar to independent brightness of each pixel of the original color image. Therefore, in the converted grayscale image, the gradient of a color and the independent brightness of each pixel for the original color image can be preserved. In addition, a visual appearance of the original color image can be effectively preserved, so that a high-quality grayscale image can be obtained.

Also, the method of converting a color image into a grayscale image according to an exemplary embodiment of the present invention can be widely used in various applications, such as printers, copiers, faxes, image processing softwares, digital cameras, computer vision softwares and systems.

DESCRIPTION OF DRAWINGS

FIG. 5 shows an image converted using a method of converting a color image into a grayscale image according to an exemplary embodiment of the present invention.

MODES OF THE INVENTION

Figure 1:
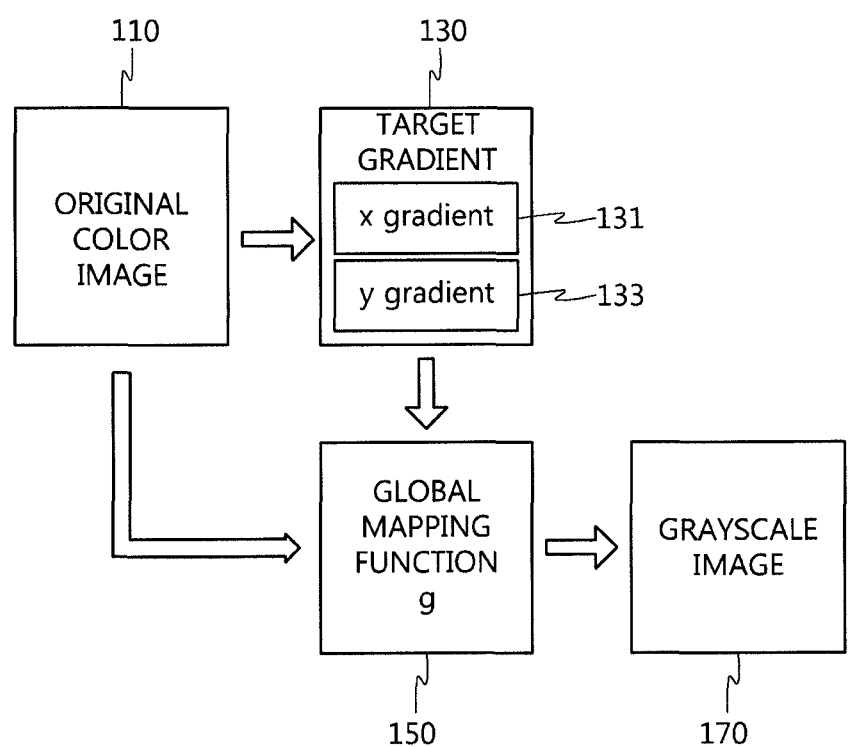
FIG. 1 is a conceptual diagram schematically illustrating a method of converting a color image into a grayscale image according to an exemplary embodiment of the present invention.

Hereinafter, an exemplary embodiment of the present invention will be described in detail. However, the present invention is not limited to the exemplary embodiment disclosed below, but can be implemented in various forms. The following exemplary embodiment is described in order to enable those of ordinary skill in the art to embody and practice the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used here, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiment only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

When described with reference to the drawings, the same or corresponding components are represented by the same reference numerals and repeated description thereof will be omitted.

FIG. 1 is a conceptual diagram schematically illustrating a method of converting a color image into a grayscale image according to an exemplary embodiment of the present invention.

Referring to FIG. 1, in the method of converting a color image into a grayscale image according to the exemplary embodiment of the present invention, a target gradient 130 reflecting color differences between respective pixels of an original color image 110 is generated first. Here, the target gradient 130 includes an x gradient 131 and a y gradient 133. The x gradient 131 represents a variation between two pixels adjacent to each other in an x axial direction among all pixels constituting the original color image, whereas the y gradient 133 represents a variation between two pixels adjacent to each other in a y axial direction.

Thereafter, a global mapping function (g) 150 that can minimize a difference between the generated target gradient 130 and a gradient of a converted final grayscale image 170 is determined. Then, the determined global mapping function 150 is applied to each pixel in the original color image 110 to convert the original color image 110 into the grayscale image 170. Therefore, it is possible to quickly convert a color image into a grayscale image while preserving original visual features of the color image.

Figure 2:
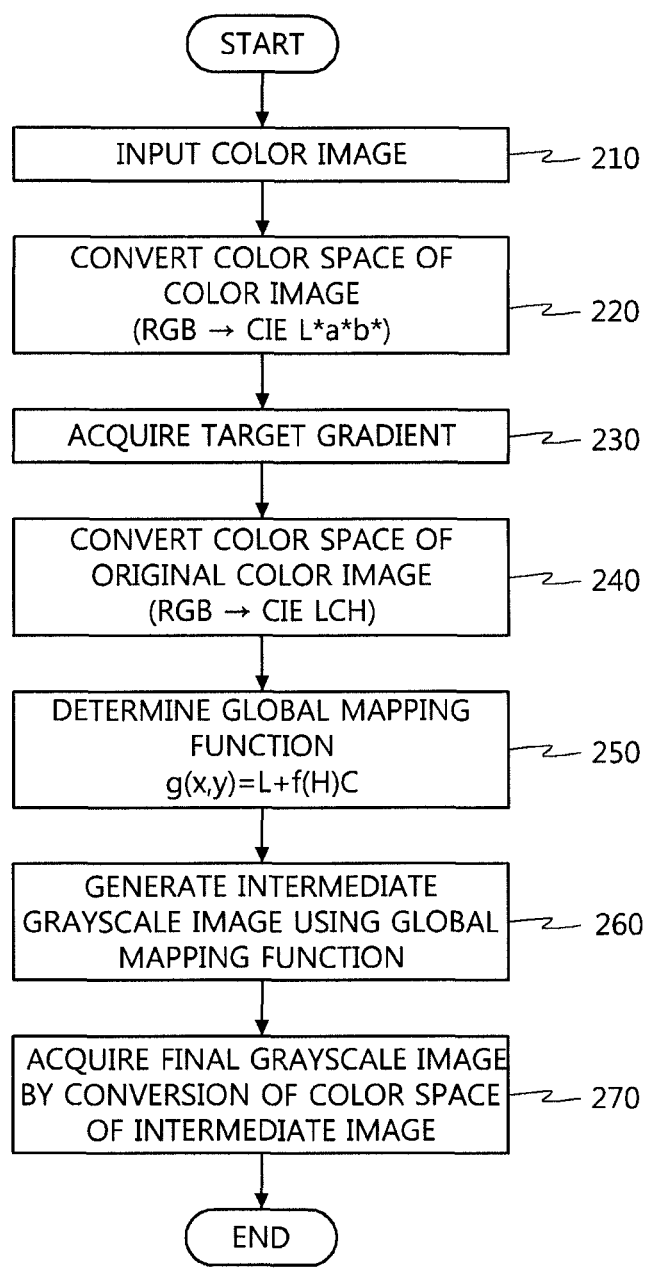
FIG. 2 is a flowchart illustrating a method of converting a color image into a grayscale image according to an exemplary embodiment of the present invention.
Figure 3:
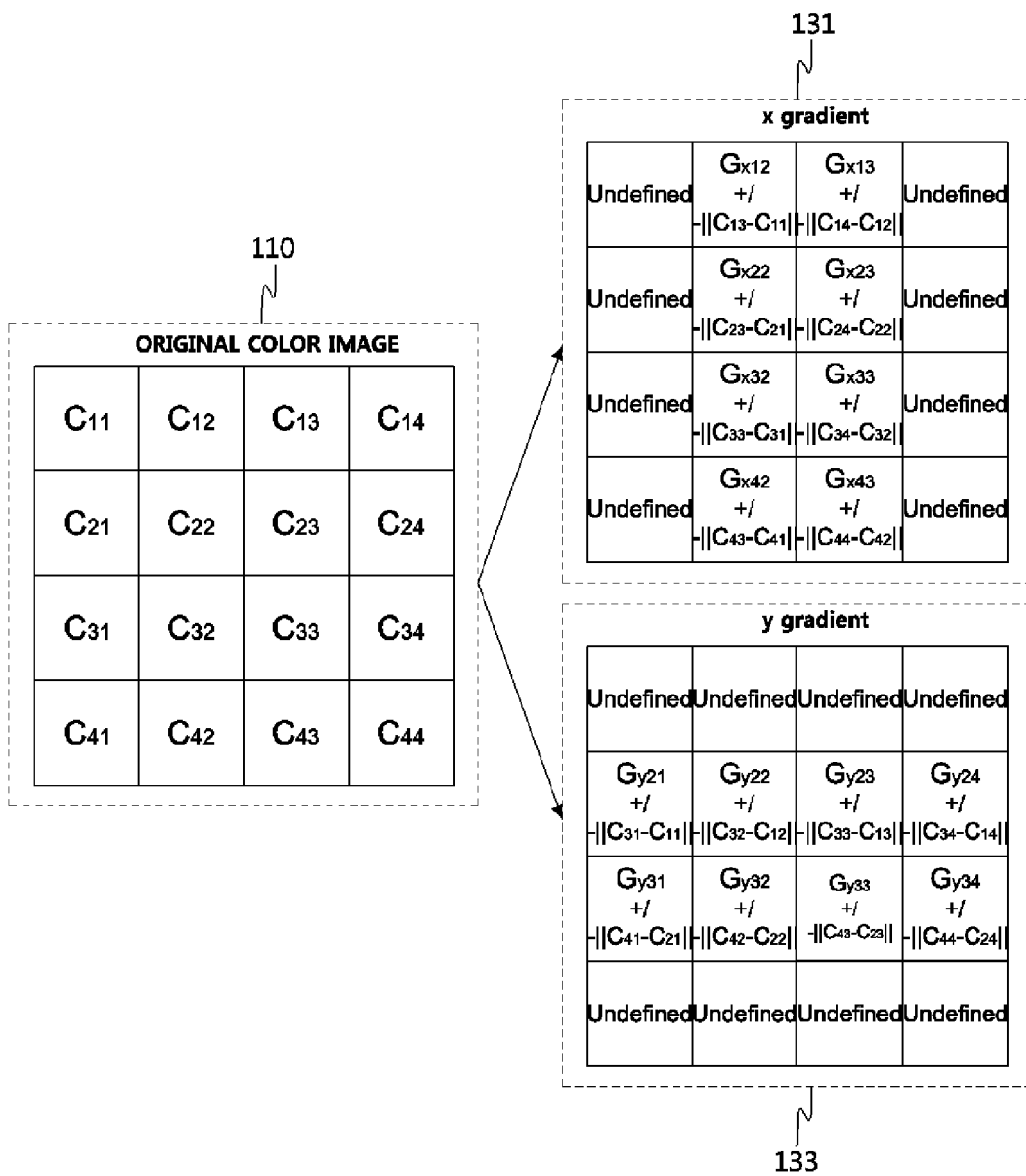
FIG. 3 is a conceptual diagram specifically illustrating a step of acquiring a target gradient shown in FIG. 2.

FIG. 2 is a flowchart illustrating a method of converting a color image into a grayscale image according to an exemplary embodiment of the present invention, and FIG. 3 is a conceptual view specifically illustrating a step of acquiring a target gradient shown in FIG. 2. Also, FIG. 4 is a flowchart specifically illustrating a process of determining a global mapping function shown in FIG. 2.

It is assumed that the method of converting a color image into a grayscale image according to an exemplary embodiment of the present invention is executed by a digital processor performing color conversion of an image.

Figure 4:
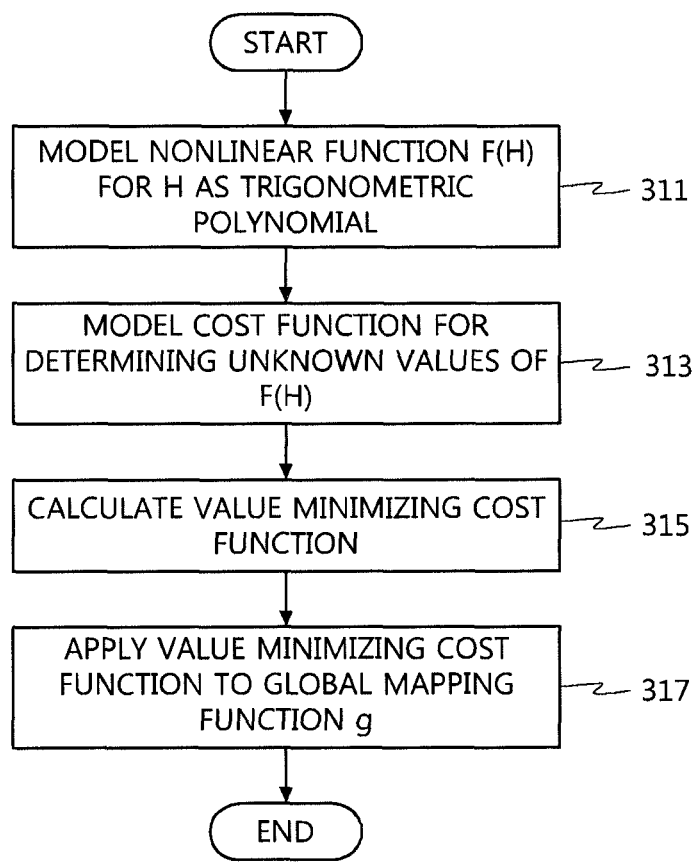
FIG. 4 is a flowchart specifically illustrating a process of determining a global mapping function shown in FIG. 2.

Referring to FIGS. 2 to 4, first, an original color image to be converted into a grayscale image is input to the digital processor (step 210). Here, the input original color image may be represented in a red, green, blue (RGB) color space. Also, when the digital processor is a digital copier or a camera, the original color image may be provided from an image sensor in the corresponding apparatus. Alternatively, when the digital processor is an information processing apparatus like a computer, a color image may be read from its storage device and provided.

Thereafter, the digital processor converts a color space of the input original color image from an RGB color space to a Commission Internationale de L'Eclairage (CIE) L*a*b* color space (step 220). Although it is assumed in the exemplary embodiment of the present invention shown in FIG. 2 that the color space of the original color image is converted from RGB to CIE L*a*b*, the present invention is not limited to this assumption. The conversion can be made to various well-known color spaces in other exemplary embodiments of the present invention.

Next, the digital processor acquires a target gradient including an x gradient and a y gradient of the color image whose color space has been converted into CIE L*a*b* to convert the original color image into the grayscale image in reflection of a color difference of each pixel in the original color image (step 230).

In particular, the target gradient includes an x gradient and a y gradient which represent an x axial variation and a y axial variation between two adjacent pixels, respectively, with respect to a predetermined pixel among those constituting the original color image.

For example, when the original color image 110 has 4 by 4 pixels, as shown in FIG. 3, it is possible to acquire the x gradient 131 based on a difference between two pixels (e.g., $C_{23}$ and $C_{21}$ for $G_x^{22}$) horizontally adjacent to each pixel in the original color image 110. Also, it is possible to acquire the y gradient 133 based on a difference between two pixels (e.g., $C_{32}$ and $C_{12}$ for $G_y^{22}$) vertically adjacent to each pixel in the original color image 110.

Although it has been described in the exemplary embodiment of the present invention shown in FIG. 3 that the target gradient is acquired using a central difference, the target gradient may be acquired using various manners, such as forward difference, a backward difference, or a sobel filter in other exemplary embodiments of the present invention. A method of converting a color image into a grayscale image according to an exemplary embodiment of the present invention in which a target gradient is acquired using a central difference will be described below as an example.

In FIG. 3, each pixel of the original color image 110 represents three-dimensional values, which include R, G, and B components. However, each pixel of the x and y gradients 131 and 133 is expressed as a signed one-dimensional value of a difference between two adjacent pixels in the original color image 110, numerically indicating the color difference of each pixel in the original color image 110.

The signed one-dimensional value has a sign and a magnitude of the difference between the two pixels. The sign of the difference between the two pixels may be calculated using a sign of brightness difference between two pixels. The brightness for each pixel used herein may be calculated by applying various manners, such as CIE L, CIE Y, National Television System Committee (NTSC) Y, or a brightness value considering the Helmholtz-Kohlrausch effect. An exemplary embodiment of the present invention in which, for the calculation of the difference between brightness values, a sign of a difference between brightness values considering the Helmholtz-Kohlrausch effect is ideally used, and when the difference between the brightness values is zero, a sign of the difference of brightness of CIE L is used as an alternative will be described below as an example.

There are various methods for acquiring brightness values considering the Helmholtz-Kohlrausch effect. However, an exemplary embodiment of the present invention is based on the assumption that the brightness value is calculated using a Nayatani variable achromatic color (VAC) model.

Also, the magnitude of difference between two pixels among the signed one-dimensional value may be calculated using various color difference models, such as CIE76, CIE94, CIEDE2000, and CMC 1:c. In an exemplary embodiment of the present invention, an example in which a size of difference between two pixels is calculated by the following equation (1), which is obtained by modifying and expanding CIE76, is described.

$$\|c_i - c_j\| = \sqrt{(L_i - L_j)^2 + \left(\alpha \frac{\sqrt{(a_i^* - a_j^*)^2 - (b_i^* - b_j^*)^2}}{R}\right)^2} \quad (1)$$

In equation (1), $c_i$ and $c_j$ denote two colors included in the original color image 110. L, a* and b* denote L, A and B components of each color represented in a CIE LAB color space, respectively. Also, R is a normalization coefficient for constantly maintaining the range of a brightness difference (i.e., ($L_i-L_j$)) and the range of a chromatic difference $$\left(\text{i.e.,}\left(\frac{\sqrt{(a_i^*-a_j^*)^2-(b_i^*-b_j^*)^2}}{R}\right)^2\right).$$

α is a user parameter, which determines how much chromatic difference is applied to a color difference.

The grayscale image converted through the reconstruction of the x gradient 131 and the y gradient 133 which are calculated by the above-described method includes features of the original color image 110 as they are, based on the color contrast of each pixel in the original color image 110.

Referring back to FIG. 2, the method of converting a color image into a grayscale image according to the exemplary embodiment of the present invention will be described. As described above, the digital processor acquires the target gradient for the original color image in step 230, and then performs a color space conversion of the original color image from RGB to CIE LCH (step 240).

Thereafter, the digital processor determines a global mapping function (g) for converting the original color image into the grayscale image (step 250).

In an exemplary embodiment of the present invention, a global mapping method is used to convert the color image into the grayscale image. This means that the color image is converted into the grayscale image by applying the global mapping function of mapping an input color value into a grayscale value to each pixel.

A process of determining the global mapping function will be described in further detail below with reference to FIG. 4.

In an exemplary embodiment of the present invention, the global mapping function (g) is defined by equation (2) below.

$$g(x,y)=L+f(H)C \qquad (2)$$

In equation (2), L, C, and H denote L, C, and H components for a color which is obtained by converting a color of a pixel at coordinates (x, y) in the original color image into a CIE LCH color space. Also, f(H) denotes a nonlinear function with respect to H.

First, for the determination of the global mapping function g, f(H) is modeled as expressed by equation (3) (step 311).

$$f(H)=\sum_{k=1}^{n}(A_k\cos(kH)+B_k\sin(kH))+A_0 \qquad (3)$$

In equation (3), $A_k$, $B_k$ and $A_0$ are unknowns. The global mapping function g is determined when the values for the unknowns are determined.

The global mapping function (g) should be determined so that the gradient of each pixel in the grayscale image is maximally similar to the target gradient acquired from the original color image which is obtained in step 230 of FIG. 2. In addition to this, the global mapping function (g) should be determined so that the brightness of each pixel in the grayscale image is maximally similar to that of each pixel in the original color image.

In order to determine the global mapping function g satisfying desired conditions mentioned above, a cost function that embeds those conditions is modeled (step 313). A set of certain values for Ak, Bk, and A0 in f(H) is then calculated so that it minimizes the modeled cost function. The determined values for Ak, Bk, and A0 in f(H) determines f(H) and successively the global mapping function g (step 317).

First, the difference between a gradient of the converted grayscale image and the target gradient obtained from the original color image can be expressed as defined by equation (4).

$$E_s=\sum_{(x,y)\in\Omega}\|\nabla g(x.y)-G(x.y)\|^2 \qquad (4)$$

In equation (4), $\nabla g(x.y)$ denotes a gradient of the grayscale image which is determined using the global mapping function (g), and G(x.y) denotes a gradient obtained from the original color image. Also, $\Omega$ denotes all of the pixels in the original color image.

Meanwhile, equation (3) may be expressed in a vector, as defined by equation (5) below.

$$f(H)=t^Tw \qquad (5)$$

In equation (5), t may be expressed as defined by equation (6), and w may be expressed as defined by equation (7).

$$t=\begin{cases}\cos(iH) & 1\leq i<n \\ \sin(iH) & n+1\leq i<2n \\ 1 & i=2n+1\end{cases} \qquad (6)$$

$$w=\begin{cases}A_i & 1\leq i<n \\ B_i & n+1\leq i<2n \\ A_0 & i=2n+1\end{cases} \qquad (7)$$

When w approaches zero in equation (5), unknown values defined in equation (3) $A_k$, $B_k$, and $A_0$ each approach zero as well. In such a case, therefore, the global mapping function defined in equation (2) becomes close to L, which is the brightness component of the original color image. Also, when w becomes zero (i.e., $A_k=B_k=A_0=0$) in equation (5), the global mapping function (g) defined in equation (2) becomes the same as L, which is the brightness component of the original color image.

A cost function may be defined by equation (8), based on the above-mentioned description. As the cost function decreases, the values of $A_k$, $B_k$ and $A_0$ decrease as well. Therefore, the grayscale value of the grayscale image converted through the global mapping function (g) becomes similar to the value indicating the brightness of the original color image.

$$E_r=w^TIw \qquad (8)$$

In equation (8), I denotes an identity matrix.

In an exemplary embodiment of the present invention, a final cost function for determining the global mapping function (g) used to convert a color image into a grayscale image may be defined by the following equation (9) which is obtained by linear combination of equation (4) and equation (8).

$$E=\sum_{(x,y)\in\Omega}\|\nabla g(x.y)-(G.y)\|^2+\lambda w^TIw \qquad (9)$$

In equation (9), λ denotes a weight for determining the rate of respecting the original brightness of color pixels over the contrast preservation.

When equation (5) is substituted into equation (2), equation (10) may be acquired.

$$g(x,y)=L+C \cdot t^T w \quad (10)$$

Thereafter, when equation (10) is substituted into equation (9), equation (9) may be expressed as defined by equation (11) below.

$$E=w^T(M+\lambda J)w-2b^T w+\text{const} \quad (11)$$

In equation (11), M is expressed as defined by equation (12), and b is expressed as defined by equation (13).

$$M = \sum_{\Omega} (C \cdot t)_x (C \cdot t)_x^T + (C \cdot t)_t (C \cdot t)_y^T \quad (12)$$

$$b = \sum_{\Omega} (G^x - L_x)(C \cdot t)_x + (G^y - L_y)(C \cdot t)_y \quad (13)$$

Using a principle in which, when differentiation for equation (11) is performed by w, its derivative becomes zero, a value of w that minimizes a cost function E may be calculated, as defined by equation (14) below.

$$w=(M_s+\lambda J)^{-1}b \quad (14)$$

By substituting w calculated as described above into equation (10), the global mapping function (g) is determined.

Referring back to FIG. 2, when the global mapping function (g) is determined by the above-mentioned method, the digital processor converts the original color image into an intermediate grayscale image by applying the determined global mapping function (g) to each pixel of the original color image (step 260).

Since the intermediate grayscale image has values in the CIE L space, the value in the CIE L space is converted into a value in a Y space of CIE XYZ to implement visualization of a grayscale image, thereby acquiring a final grayscale image displayable on a typical image display (step 270). In other words, the conversion into the final grayscale image is made by applying the method of converting L of a CIE L*a*b* color space into Y of the CIE XYZ color space to the intermediate grayscale image.

FIG. 5 shows an image converted using a method of converting a color image into a grayscale image according to an exemplary embodiment of the present invention. FIG. 5A shows an image of the original color image, and FIG. 5B shows a grayscale image converted using luminance Y defined in the CIE XYZ color space according to a conventional method. Also, FIG. 5C shows a grayscale image converted according to an exemplary embodiment of the present invention.

As shown in FIG. 5A, the original color image has a first area 501, a second area 503, a third area 505, a fourth area 507, and a fifth area 509, which have colors distinguishable from one another. The first area 501 has an object 510 whose color is distinguishable from that of the first area 501.

In the conventional color conversion method, the original color image is converted into the grayscale image using only independent brightness, that is, luminance (CIE Y), of each pixel thereof. Therefore, the independent brightness of each pixel can be preserved, but color contrast of the original color image fails to be preserved, which results in the deterioration of the converted grayscale image in terms of quality.

That is, in an image obtained by converting colors into grayscale levels according to the conventional color conversion method as shown in FIG. 5B, the second area 503, the third area 505, the fourth area 507, and the fifth area 509, which are clearly distinguished from each other in the original color image shown in FIG. 5A, are represented as one area 523, thus losing a color contrast of the original color image. Also, the object 510 in the first area 501 of the original color image fails to be represented in the first area 521 of FIG. 5B, and the converted grayscale image has different content than the original color image.

On the other hand, the method of converting a color image into a grayscale image according to an exemplary embodiment of the present invention is achieved by the following processes. First, a target gradient that can preserve features of the original color image is generated, and a global mapping function (g) is determined to perform color conversion so that the target gradient is maximally similar to that of a converted grayscale image. Thereafter, the determined global mapping function (g) is applied to each pixel of the original color image to convert the original color image into the grayscale image. Therefore, it is possible to generate the grayscale image including features of the original color image as they are, and as a result, a high-quality grayscale image can be obtained.

In other words, as shown in FIG. 5C, the first to fifth areas 501 to 509 in the original color image are converted into grayscale areas 531 to 539 corresponding to colors of the first to fifth areas 501 to 509, respectively. Therefore, the grayscale image converted according to an exemplary embodiment of the present invention can preserve visual features corresponding to color difference of the original color image. Also, the object 510 shown in the first area 501 of the original color image is represented at a same position 540 of the first area 531 in the converted grayscale image shown in FIG. 5C as it was originally placed.

While the invention has been shown and described with reference to certain exemplary embodiment thereof, it will be understood by those skilled in the art that various changes in form and details may be made therein without departing from the spirit and scope of the invention as defined by the appended claims.

The invention claimed is:

1. A method of converting a color image into a grayscale image, the method comprising:
   inputting an original color image;
   acquiring a target gradient including features of the input original color image;
   determining a global mapping function for converting the original color image into a grayscale image based on the acquired target gradient; and
   converting the original color image into a grayscale image using the determined global mapping function,
   wherein determining the global mapping function for converting the original color image into the grayscale image based on the acquired target gradient includes modeling the global mapping function as g=L+f(H)C, L, C, and H denote luminance, chroma, hue components of a color in a CIE LCH color space, respectively, and f(H) denotes a trigonometric polynomial of H.

2. The method of claim 1, wherein acquiring the target gradient including the features of the input original color image includes converting a color space of the input original color image into a Commission Internationale de L'Eclairage (CIE) L*a*b* color space.

3. The method of claim 2, wherein acquiring the target gradient including the features of the input original color image includes:
   acquiring an x gradient by determining a sign and a value of a difference between two pixels adjacent to each pixel of the converted color image in the CIE L*a*b* color space in an x axial direction; and acquiring a y gradient by determining a sign and a value of a difference between two pixels adjacent to each pixel of the converted color image in the CIE L*a*b* color space in a y axial direction.

4. The method of claim 1, wherein determining the global mapping function for converting the original color image into the grayscale image based on the acquired target gradient includes determining a global mapping function minimizing a difference between a gradient of the converted grayscale image and the corresponding acquired gradient of the original color image.

5. The method of claim 1, wherein determining the global mapping function for converting the original color image into the grayscale image based on the acquired target gradient further includes:
- modeling a cost function for determining coefficients in the trigonometric polynomial f(H) included in the global mapping function;
- acquiring a value minimizing the cost function; and
- determining the global mapping function by applying the value to the global mapping function.

6. The method of claim 1, wherein converting the original color image into the grayscale image using the determined global mapping function includes generating the grayscale image by applying the determined global mapping function to each pixel of the original color image.

7. The method of claim 6, wherein converting the original color image into the grayscale image using the determined global mapping function includes:
- generating an intermediate grayscale image by applying the determined global mapping function to each pixel of the original color image; and
- converting the intermediate grayscale image into the grayscale image by applying a scheme of converting L of a CIE LAB color space into Y of a CIE XYZ color space to the intermediate grayscale image.

8. A non-transitory recording medium in which a program of commands executable by a digital processor performing image color conversion is materially embodied and recording the program readable by the digital processor, the program comprising:
- acquiring a target gradient including features of an input original color image;
- determining a global mapping function for converting the original color image into a grayscale image based on the acquired target gradient; and
- converting the original color image into a grayscale image using the determined global mapping function,
- wherein determining the global mapping function for converting the original color image into the grayscale image based on the acquired target gradient includes modeling the global mapping function as $g=L+f(H)C$, L, C, and H denote luminance, chroma, hue components of a color in a CIE LCH color space, respectively, and f(H) denotes a trigonometric polynomial of H.

* * * * *